United States Patent
Ryu et al.

(10) Patent No.: US 10,985,433 B2
(45) Date of Patent: Apr. 20, 2021

(54) BATTERY MODULE HAVING STRUCTURE BREAKING CONNECTOR BY USING VENTING GAS

(71) Applicant: LG CHEM, LTD., Seoul (KR)

(72) Inventors: Jae-Uk Ryu, Daejeon (KR); Dal-Mo Kang, Daejeon (KR); Su-Chang Kim, Daejeon (KR); Jeong-O Mun, Daejeon (KR); Ji-Su Yoon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 76 days.

(21) Appl. No.: 16/477,784

(22) PCT Filed: Jul. 18, 2018

(86) PCT No.: PCT/KR2018/008130
§ 371 (c)(1),
(2) Date: Jul. 12, 2019

(87) PCT Pub. No.: WO2019/050152
PCT Pub. Date: Mar. 14, 2019

(65) Prior Publication Data
US 2019/0372083 A1     Dec. 5, 2019

(30) Foreign Application Priority Data

Sep. 8, 2017   (KR) .................. 10-2017-0115358

(51) Int. Cl.
*H01M 50/574*      (2021.01)
*H01M 50/578*      (2021.01)
(Continued)

(52) U.S. Cl.
CPC ....... *H01M 50/578* (2021.01); *H01M 10/647* (2015.04); *H01M 50/172* (2021.01);
(Continued)

(58) Field of Classification Search
None
See application file for complete search history.

(56) References Cited

U.S. PATENT DOCUMENTS

2006/0099493 A1   5/2006   Nishimura et al.
2006/0238162 A1   10/2006  Cheon et al.
(Continued)

FOREIGN PATENT DOCUMENTS

CN   1855600 A      11/2006
CN   105576169 A    5/2016
(Continued)

OTHER PUBLICATIONS

International Search Report (PCT/ISA/210) issued in PCT/KR2018/008130, dated Oct. 23, 2018.
(Continued)

*Primary Examiner* — Lucas J. O'Donnell
(74) *Attorney, Agent, or Firm* — Birch, Stewart, Kolasch & Birch, LLP

(57) ABSTRACT

A battery module has a cell stack including a first battery cell and a second battery cell, which respectively have electrode leads and are stacked to face each other. A connector configured to connect the electrode leads of the pair of battery cells. A support frame provided to at least one side of the cell stack and having a pair of lead slits at which the electrode leads are drawn and an injection slit formed at a location corresponding to the connector to give a passage through which a venting gas discharged at venting of the battery cell is injected.

13 Claims, 8 Drawing Sheets

(51) Int. Cl.
   *H01M 10/647* (2014.01)
   *H01M 50/172* (2021.01)
   *H01M 50/183* (2021.01)
   *H01M 50/342* (2021.01)
   *H01M 50/538* (2021.01)

(52) U.S. Cl.
   CPC ....... *H01M 50/183* (2021.01); *H01M 50/342* (2021.01); *H01M 50/538* (2021.01)

(56) References Cited

U.S. PATENT DOCUMENTS

| | | |
|---|---|---|
| 2010/0266881 A1 | 10/2010 | You et al. |
| 2013/0236754 A1 | 9/2013 | Lim |
| 2014/0004397 A1 | 1/2014 | Lee et al. |
| 2014/0011060 A1 | 1/2014 | Yang et al. |
| 2014/0023887 A1 | 1/2014 | Lim |
| 2016/0111757 A1* | 4/2016 | Kim ................. H01M 2/345 429/61 |
| 2016/0248068 A1 | 8/2016 | Ha |
| 2016/0315301 A1 | 10/2016 | Kim et al. |
| 2018/0053976 A1 | 2/2018 | Park et al. |
| 2018/0114964 A1 | 4/2018 | Kim et al. |
| 2018/0254444 A1 | 9/2018 | Yoon et al. |

FOREIGN PATENT DOCUMENTS

| | | |
|---|---|---|
| CN | 106784487 A | 5/2017 |
| EP | 3062364 A1 | 8/2016 |
| JP | 2000-82371 A | 3/2000 |
| JP | 4454238 B2 | 4/2010 |
| JP | 5454364 B2 | 3/2014 |
| JP | 2016-157670 A | 9/2016 |
| KR | 10-0968050 B1 | 7/2010 |
| KR | 10-2012-0055156 A | 5/2012 |
| KR | 10-2012-0066363 A | 6/2012 |
| KR | 10-2012-0108677 A | 10/2012 |
| KR | 10-2013-0102502 A | 9/2013 |
| KR | 10-2013-0117637 A | 10/2013 |
| KR | 10-2014-0002115 A | 1/2014 |
| KR | 10-2014-0002120 A | 1/2014 |
| KR | 10-1449307 B1 | 10/2014 |
| KR | 10-2015-0032785 A | 3/2015 |
| KR | 10-2015-0065964 A | 6/2015 |
| KR | 10-2017-0027150 A | 3/2017 |
| KR | 10-2017-0047687 A | 5/2017 |
| WO | WO 2016/171517 A1 | 10/2016 |

OTHER PUBLICATIONS

European Search Report dated May 4, 2020 in European Application No. 18853825.0.

* cited by examiner

BATTERY MODULE HAVING STRUCTURE BREAKING CONNECTOR BY USING VENTING GAS

TECHNICAL FIELD

The present disclosure relates to a battery module with a structure to break a connector using a venting gas, and more particularly, to a battery module with a structure to break a connector by the pressure of gas that is discharged out as a pouch case is broken due to the increase of an inner pressure of a battery cell during a charging/discharging process.

The present application claims priority to Korean Patent Application No. 10-2017-0115358 filed on Sep. 8, 2017 in the Republic of Korea, the disclosures of which are incorporated herein by reference.

BACKGROUND ART

As portable electric products such as video cameras, cellular phones and portable PCs are used more broadly, the importance of secondary batteries mainly used as a driving power source therefor is increasing.

A secondary battery capable of charging and discharging, different from a primary battery cannot be recharged is being actively studied in high-tech fields such as digital cameras, cellular phones, laptop computers, power tools, electric bicycles, electric vehicles, hybrid electric vehicles and mass-capacity power storage devices.

In particular, a lithium secondary battery has a high energy density per unit weight and allows rapid charging, compared to other secondary batteries such as lead storage batteries, nickel-cadmium batteries, nickel-hydrogen batteries and nickel-zinc batteries, and thus it is used more and more.

The lithium secondary battery has an operating voltage of 3.6V or above. The lithium secondary battery is used as a power source for a portable electronic device, or a plurality of lithium secondary batteries are connected in series or in parallel and used for a high output electric vehicle, a hybrid electric vehicle, a power tool, an electric bicycle, a power storage device or a UPS.

The lithium secondary battery has an operating voltage three times higher than that of a nickel-cadmium battery or a nickel-metal hydride battery and has a high energy density per unit weight. For this reason, the lithium secondary battery tends to be used more and more.

The lithium secondary battery may be classified into a lithium ion battery using a liquid electrolyte and a lithium ion polymer battery using a polymer solid electrolyte depending on an electrolyte type. In addition, the lithium ion polymer battery may be classified into a pure solid lithium ion polymer battery without containing any electrolyte and a lithium ion polymer battery using a gel polymer electrolyte containing an electrolytic solution, depending on a polymer solid electrolyte type.

In the lithium ion battery using a liquid electrolyte, a cylindrical or rectangular metal can is generally used as a container in a welded and sealed form. Since the can-type secondary battery using the metal can as a container has a fixed shape, there is a disadvantage that it restricts the design of an electric product using the can-type secondary battery as a power source, and it is difficult to reduce the volume. Thus, a pouch-type secondary battery prepared by putting an electrode assembly and an electrolyte in a pouch packaging material made of a film and sealing the pouch packaging material has been developed and used.

However, the lithium secondary battery has a risk of explosion when being overheated and thus it is important to secure safety. The lithium secondary battery is overheated due to various factors, one of which is an overcurrent flow above a limit through the lithium secondary battery. If the overcurrent flows, the lithium secondary battery is heated by the Joule heat, so the internal temperature of the battery rises rapidly. In addition, the rapid rise in temperature causes a decomposition reaction of the electrolyte, causing a thermal runaway, which eventually leads to the explosion of the battery. Overcurrent occurs in the case where a sharp metal object penetrates the lithium secondary battery, where the insulation between positive and negative electrodes is destroyed due to the shrinkage of a separator interposed between the positive and negative electrodes, where a rush current is applied to the battery due to abnormality of a charging circuit or a load connected to the outside, or the like.

Thus, the lithium secondary battery is used in combination with a protecting circuit in order to protect the battery against an abnormal situation such as overcurrent, and the protecting circuit generally includes a fuse element for irreversibly disconnecting a line through which a charging or discharging current flows when overcurrent occurs.

FIG. 1 is a circuit diagram for illustrating an arrangement and an operating mechanism of a fuse element provided in a protecting circuit coupled to a battery pack including a lithium secondary battery.

As shown in FIG. 1, in order to protect the battery pack when overcurrent occurs, the protecting circuit includes a fuse element 1, a sensing resistor 2 for sensing overcurrent, a microcontroller 3 for monitoring the occurrence of overcurrent and operating the fuse element 1 when overcurrent occurs, and a switch 4 for switching the inflow of an operating current to the fuse element 1.

The fuse element 1 is installed on a main line connected to an outermost terminal of the battery pack. The main line refers to a wiring through which a charging current or a discharging current flows. In FIG. 1, it is depicted that the fuse element 1 is installed at a high-potential line (Pack+).

The fuse element 1 is a three-terminal element, where two terminals are connected to the main line through which a charging or discharging current flows and one terminal is connected to the switch 4. In addition, the fuse element 1 includes a fuse 1a connected to the main line in series and melted and cut at a certain temperature and a resistor 1b for applying heat to the fuse 1a.

The microcontroller 3 periodically detects the voltage at both ends of the sensing resistor 2 and monitors whether overcurrent occurs. If it is determined that overcurrent occurs, the microcontroller 3 turns on the switch 4. If so, the current flowing on the main line is bypassed to the fuse element 1 and applied to the resistor 1b. Accordingly, the Joule heat generated at the resistor 1b is conducted to the fuse 1a to raise the temperature of the fuse 1a. If the temperature of the fuse 1a rises to the melting temperature, the fuse 1a is melted and broken so that the main line is irreversibly disconnected. If the main line is disconnected, the overcurrent does not flow any more, thereby overcoming the problem caused by the overcurrent.

However, the above conventional technique has several problems. In other words, if the microcontroller 3 is broken, the switch 4 does not turn on even though overcurrent occurs. In this case, a current does not flow into the resistor 1b of the fuse element 1, and thus the fuse element 1 does not operate. Also, a space for disposing the fuse element 1 is separately required inside the protecting circuit, and a program algorithm for controlling the operation of the fuse element 1 must be loaded in the microcontroller 3. Thus, it is disadvantageous that the space efficiency of the protecting circuit is deteriorated and the load of the microcontroller 3 is increased.

DISCLOSURE

Technical Problem

The present disclosure is designed to solve the problems of the related art, and therefore the present disclosure is directed to ensuring the safety of a secondary battery in use by rapidly blocking the flow of current by using a discharge pressure of a venting gas when an inner pressure of a battery cell increases over a certain level due to an abnormal situation such as overcharge or short circuit.

However, the technical problem to be solved by the present disclosure is not limited to the above, and other objects not mentioned herein will be understood from the following description by those skilled in the art.

Technical Solution

In one aspect of the present disclosure, there is provided a battery module, comprising: a cell stack having a first battery cell and a second battery cell, which are stacked to face each other, each battery cell having an electrode lead; a connector configured to connect the electrode leads of the pair of battery cells; and a support frame provided to at least one side of the cell stack and having a pair of lead slits at which the electrode leads are drawn and an injection slit formed at a location corresponding to the connector to function as a passage through which a venting gas discharged at venting of the battery cell is injected.

An end of each electrode lead exposed out of the lead slit may be bent and supported by the support frame.

The injection slit may be formed at a location corresponding to a space formed between terrace portions of the first battery cell and the second battery cell.

A bonding portion between the support frame and the cell stack may be sealed so that the venting gas is discharged out only through the injection slit.

A sealing member may be interposed in an empty space formed between an inner surface of the lead slit and the electrode lead.

The battery cell may include an electrode assembly having an electrode tab; an electrode lead attached to the electrode tab; a pouch case configured to accommodate the electrode assembly so that the electrode lead is drawn out; and a sealing tape having a venting pattern and interposed between the electrode lead and an inner surface of the pouch case.

The venting pattern may be a notch formed with a predetermined depth along an extension direction of the electrode lead.

The venting pattern may be shaped to have a gradually decreasing width along an extension direction of the electrode lead.

The venting pattern may have a wedge shape.

The venting pattern may be provided in plural, and the plurality of venting patterns may be spaced apart from each other along a longitudinal direction of the sealing tape.

The pouch case may have a sealing region formed at a rim thereof, and at least a portion of the venting pattern may be located within the sealing region.

The venting pattern may be formed at both surfaces of the electrode lead.

Advantageous Effects

According to an embodiment of the present disclosure, when an inner pressure of a battery cell increases over a certain level due to an abnormal situation such as overcharge or short circuit, it is possible to prevent the secondary battery from igniting or exploding by rapidly blocking the flow of current by using a discharge pressure of a venting gas, thereby ensuring the safety of the secondary battery in use.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

First, the structure of a battery module according to an embodiment of the present disclosure will be described with reference to FIGS. 2 to 5.

Figure 1:
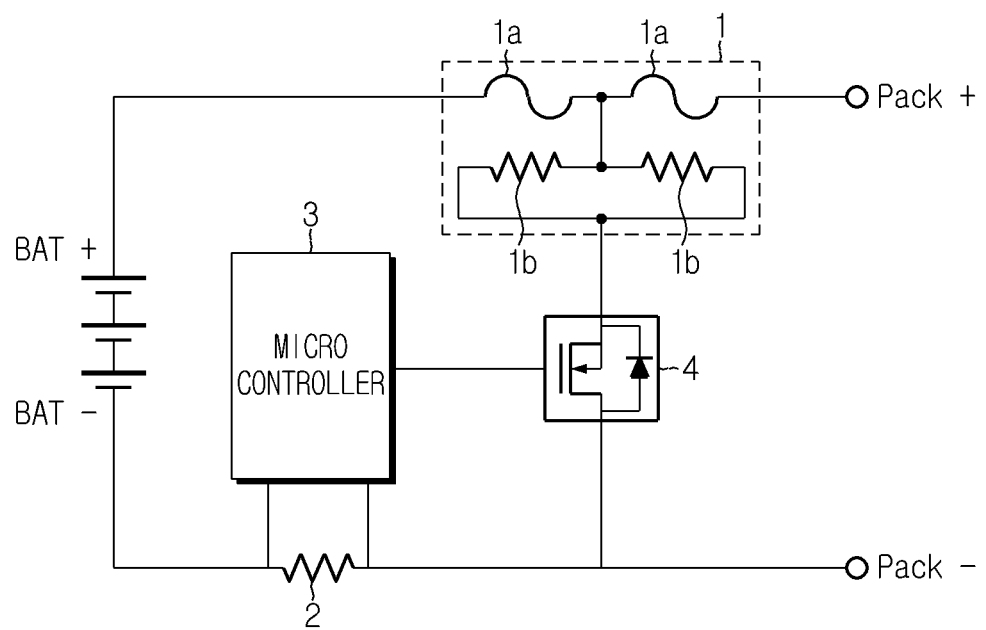
FIG. 1 is a circuit diagram for illustrating an arrangement and an operating mechanism of a fuse element provided in a protecting circuit coupled to a battery module.
Figure 2:
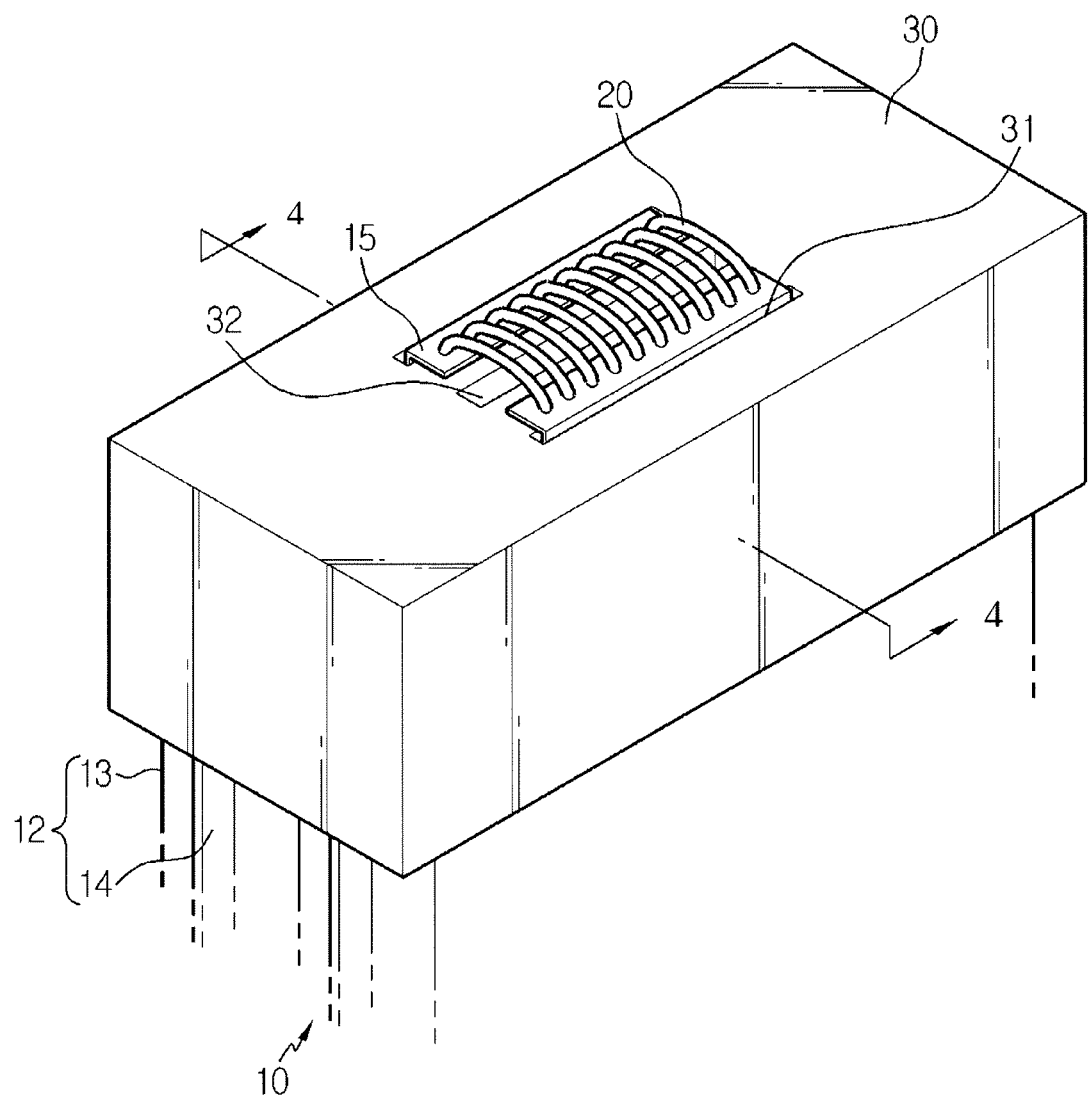
FIG. 2 is a perspective view showing a battery module according to an embodiment of the present disclosure.
Figure 3:
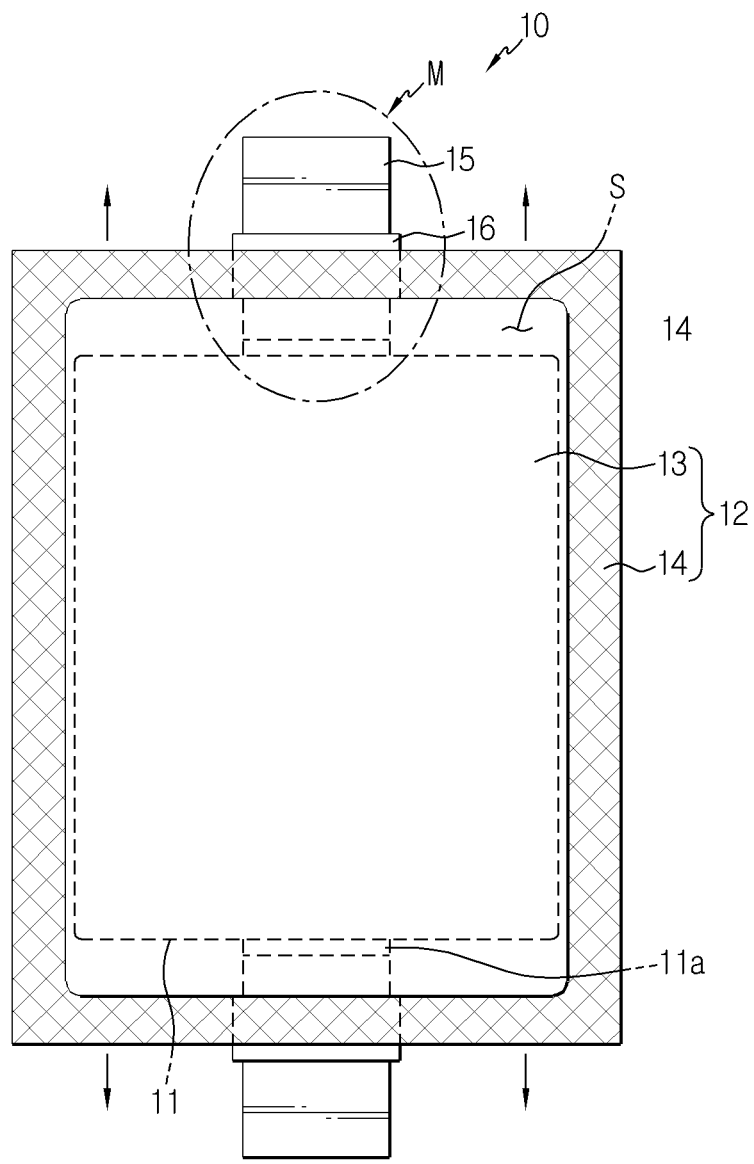
FIG. 3 is a plane view showing a battery cell applied to the battery module according to an embodiment of the present disclosure.
Figure 4:
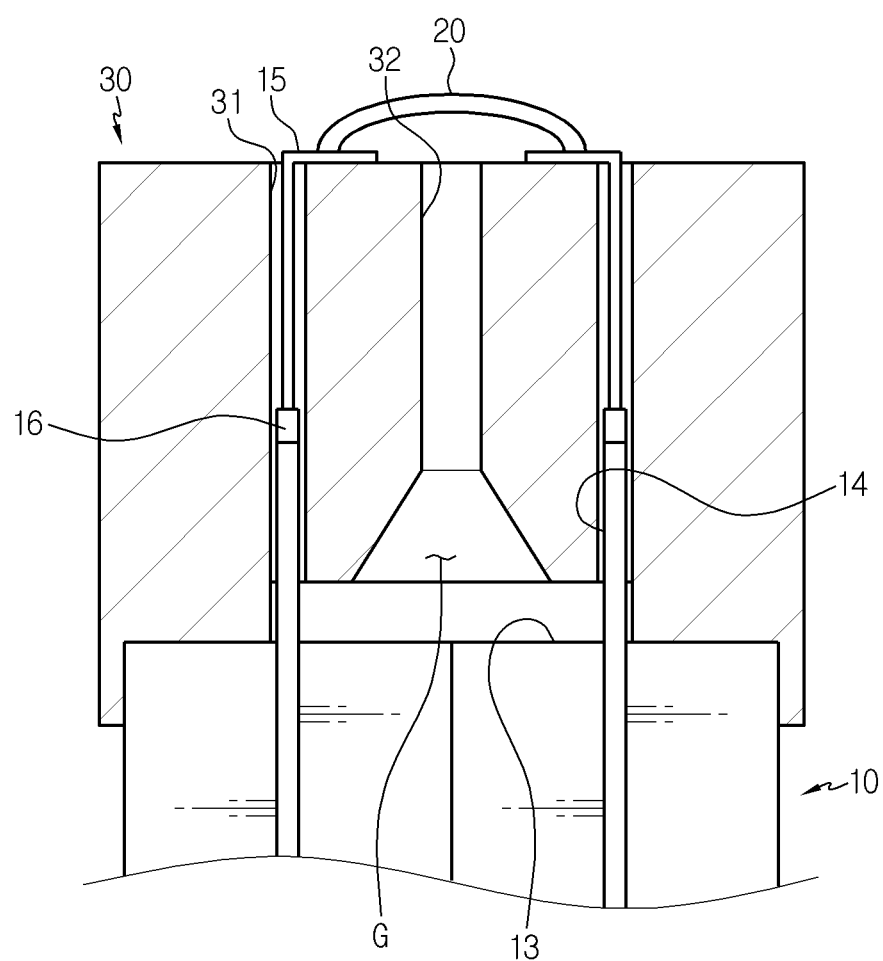
FIGS. 4 and 5 are cross-sectioned views, taken along the line 4-4 of FIG. 2.
Figure 5:
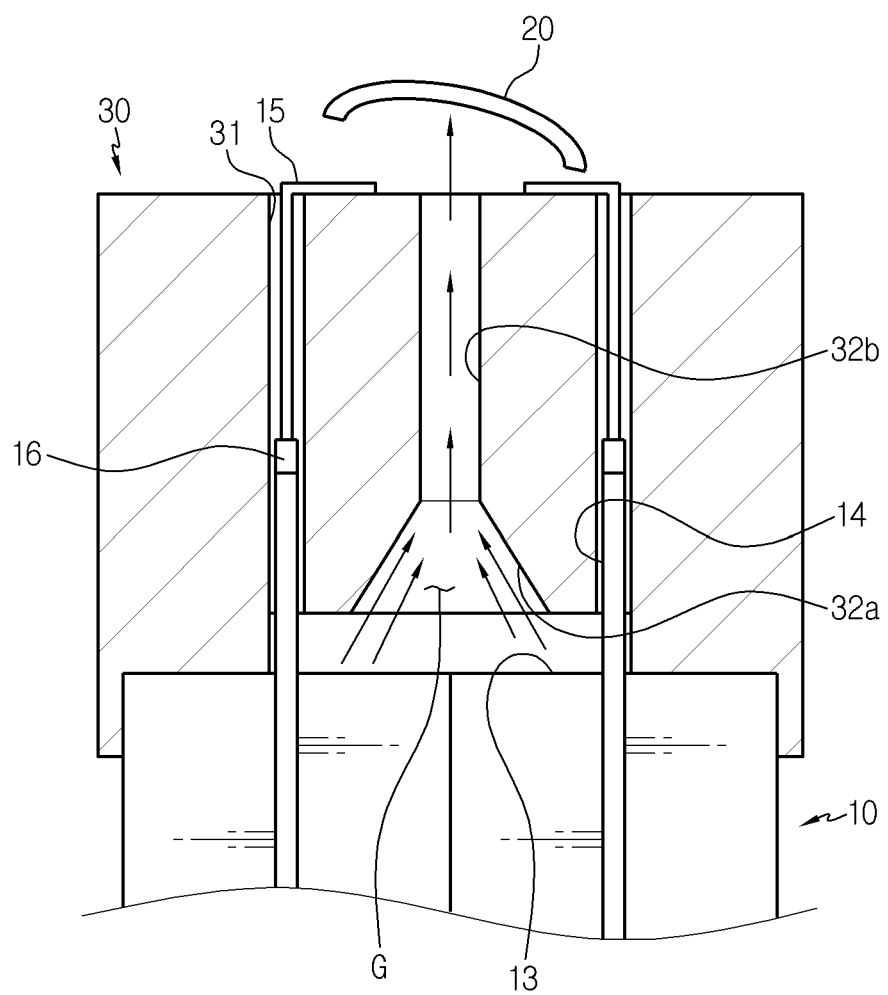

FIG. 2 is a perspective view showing a battery module according to an embodiment of the present disclosure, FIG. 3 is a plane view showing a battery cell applied to the battery module according to an embodiment of the present disclosure, and FIGS. 4 and 5 are cross-sectioned views, taken along the line 4-4 of FIG. 2.

Referring to FIG. 2, a battery module according to an embodiment of the present disclosure includes a cell stack comprising a pair of battery cells 10, a connector 20 for electrically connecting the pair of battery cells 10, and a support frame 30 provided to at least one side of the cell stack.

The cell stack includes a first battery cell 10 and a second battery cell 10 stacked to face each other. The battery cells 10 of the cell stack may be substantially the same battery cells.

Referring to FIG. 3, the pair of battery cells 10 may be, for example, pouch-type battery cells. The battery cell 10 may include an electrode assembly 11, a pouch case 12, an electrode lead 15 and a sealant 16.

Though not shown in the figures, the electrode assembly is configured so that a positive electrode plate, a separator and a negative electrode plate are laminated in order at least once, and a separator is preferably located at the outermost side in order to secure insulation. The electrode assembly 11 may have various structures such as winding-type, stacking-type and stacking/folding-type structures depending on the embodiment.

The positive electrode plate is configured so that a positive electrode active material is coated on at least one surface of a positive electrode current collector made of a conductive plate. Likewise, the negative electrode plate is configured so that a negative electrode active material is coated on at least one surface of a negative electrode current collector made of a conductive plate.

The positive electrode plate and the negative electrode plate have an uncoated region that is not coated with the positive electrode active material and the negative electrode active material, and the uncoated region functions as an electrode tab 11a that is coupled to the electrode lead 15.

The separator is located between the positive electrode plate and the negative electrode plate to electrically insulate the positive electrode plate and the negative electrode plate from each other, and the separator may have a porous membrane shape to allow lithium ions to transfer between the positive electrode plate and the negative electrode plate. The separator may be made of, for example, a porous film using polyethylene (PE) or polypropylene (PP), or a composite film thereof.

The pouch case 12 is made of an exterior material having a multi-layered film form having a metal layer and a resin layer surrounding the metal layer, and the pouch case 12 may be composed of an upper case and a lower case.

If the pouch case 12 is composed of an upper case and a lower case as above, the lower case has an accommodation portion 13 convexly protruding to accommodate the electrode assembly. In addition, the upper case may have an accommodation portion 13 convexly protruding or have a flat shape at which the accommodation portion 13 is not formed.

In other words, the battery cell 10 may be a both-surface protruding type battery cell that protrudes at both surfaces or a single-surface protruding type battery cell that protrudes only at one surface. In the drawings of the present disclosure, only a case where the battery cell 10 is a both-surface protruding type cell is shown for convenience of illustration, but the present disclosure is not limited thereto.

Meanwhile, if the battery cell is a both-surface protruding battery cell, the upper case and the lower case may have a sealing portion 14 corresponding to the outer peripheral region of the accommodation portion 13, respectively. In addition, if the battery cell 10 is a one-surface protruding battery cell, the lower case may have a sealing portions 14 corresponding to the outer peripheral region of the accommodation portion 13, and the upper case may have a sealing portion 14 formed in a region that is in contact with the sealing portions 14 of the lower case.

The pouch case 12 accommodates the electrode assembly in the accommodation portion 13, and the sealing portions 14 of the upper case and the lower case are abutted and sealed to each other by thermal fusing. The sealing portions 14 of the upper case and the lower case may be made of a resin material having a thermally fusing property so that they may be bonded to each other in a contacting state by thermal fusion.

The electrode lead 15 is connected to the electrode tab 11a of the electrode assembly and is drawn out of the pouch case 12 to serve as a medium for electrically connecting the electrode assembly to an external component. The electrode lead includes a positive electrode lead connected to the positive electrode plate and a negative electrode lead connected to the negative electrode plate. In more detail, the positive electrode lead is connected to an uncoated positive electrode region provided at the positive electrode plate, and the negative electrode lead is connected to an uncoated negative electrode region provided at the negative electrode plate.

The positive electrode lead and the negative electrode lead provided at one battery cell 10 may be drawn in the same direction or in opposite directions. In the figures of the present disclosure, it is depicted that the positive electrode lead and the negative electrode lead are drawn in opposite directions at the battery cell 10.

Meanwhile, in the present disclosure, among the sealing portions 14, the sealing portion 14 positioned in the direction in which the electrode lead 15 is drawn will be referred to as a terrace portion.

The sealant 16 is interposed between the inner surface of the sealing portion 14 and the electrode lead 15 to prevent the sealing force from being lowered between the electrode lead 15 drawn out of the pouch case 12 and the inner surface of the sealing portion 14.

Since the upper case and the lower case of the battery cell 10 are sealed by thermal fusion as described above, when the inner pressure is raised over a certain level due to the generation of gas therein, the thermally fused portion of the sealing portion 14 may be broken to cause venting.

In the battery cell 10, gas is collected in an inner gas collection space S formed between the electrode assembly 11 and the sealing portion 14 located in the direction in which the electrode lead 15 is drawn. Thus, if the inner pressure is raised above a certain level, venting occurs through the sealing portion 14 located in the direction in which the lead 15 is drawn (namely, the venting occurs in the arrow direction in FIG. 3).

The battery module according to an embodiment of the present disclosure is designed to block the electrical connection between the battery cells 10 by means of the injection pressure of the venting gas by disposing the support frame 30 to at least one side of the cell stack, as explained later, in consideration of the venting direction.

The connector 20 is a component applied to electrically connect neighboring battery cells 10 to each other and may be made of, for example, a plurality of metal wires in order to minimize the electrical resistance and to be quickly and surely broken when venting occurs at the battery cell 10.

In this case, the individual metal wires may be respectively connected to the electrode leads 15 of the neighboring pair of battery cells 10 by welding or the like, and the welding portion between the metal wire and the electrode lead 15 is broken due to the injection pressure of the venting gas to cut off the electrical connection between the neighboring battery cells 10.

The support frame 30 is disposed on at least one side of the cell stack and includes a pair of lead slits 31 through which the electrode leads 15 pass, and includes an injection slit 32 for providing a passage through which the venting gas is injected. The support frame 30 may be made of a resin material with an insulation property.

The pair of lead slits 31 are respectively formed through a region between the lower surface and the upper surface of the support frame 30 so that the electrode leads 15 of the first battery cell 10 and the second battery cell 10 may pass therethrough and be exposed to the outside. The electrode lead 15 extends upward and is exposed to the outside of the lead slit 31. The exposed end of the electrode lead 15 is bent and placed on the upper surface of the support frame 30 to be supported thereby.

The injection slit 32 is formed at a location corresponding to the connector 20 and functions as a passage through which the venting gas discharged at venting of the battery cell 10 may be injected toward the connector 20. The injection slit 32 is formed at a location corresponding to a space G formed between the terrace portions of the first battery cell 10 and the second battery cell 10.

The injection slit 32 is formed between the pair of lead slits 31 and is formed to pass between the lower surface and the upper surface of the support frame 30, similar to the lead slits 31. Also, a lower portion 32a of the injection slit has a greater width than an upper portion 32b of the injection slit.

The lower portion 32a of the injection slit corresponds to the space where the venting gas discharged from the battery cell 10 is preferentially collected. The upper portion 32b of the injection slit has a smaller width than the lower portion 32a of the injection slit, so that the venting gas collected in the lower portion 32a may be injected upward with a strong pressure.

As described above, the battery module according to an embodiment of the present disclosure may cut off the electrical connection between the neighboring battery cells 10 by breaking the connection portion between the connector 20 and the electrode lead 15 by using the venting gas injected through the injection slit 32.

In order to increase the injection pressure of the venting gas, it is desirable that the other regions than the injection slit 32 are sealed so that the venting gas does not escape through other spaces. Accordingly, the battery module according to an embodiment of the present disclosure may have a structure in which the bonding portion between the support frame 30 and the cell stack is sealed.

In addition, since the venting gas may also leak through an empty space formed between the inner surface of the lead slit 31 and the electrode lead 15, a sealing member may be interposed in the empty space formed between the inner surface of the lead slit 31 and the electrode lead 15 in order to prevent the leakage.

Next, a battery module according to another embodiment of the present disclosure will be described with reference to FIGS. 6 to 10.

Figure 6:
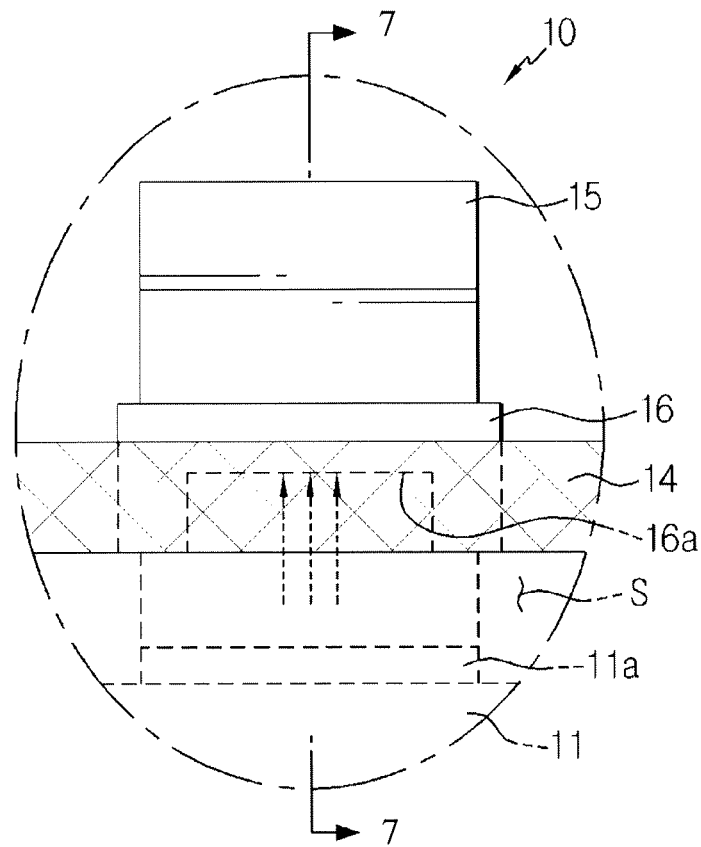
FIG. 6 is an enlarged view showing a portion M of FIG. 3.
Figure 7:
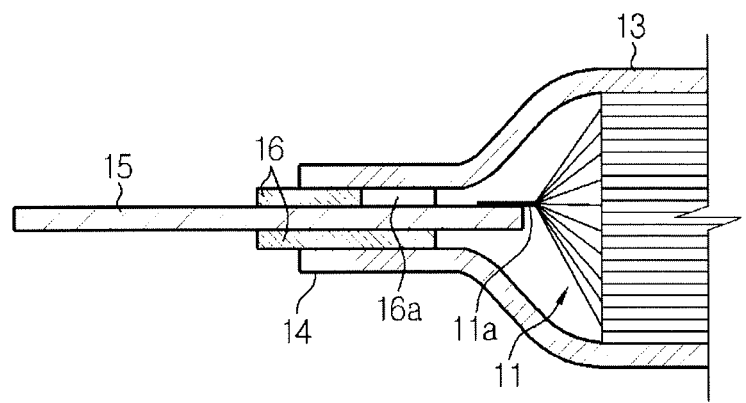
FIGS. 7 and 8 are cross-sectioned views, taken along the line 7-7 of FIG. 6.
Figure 8:
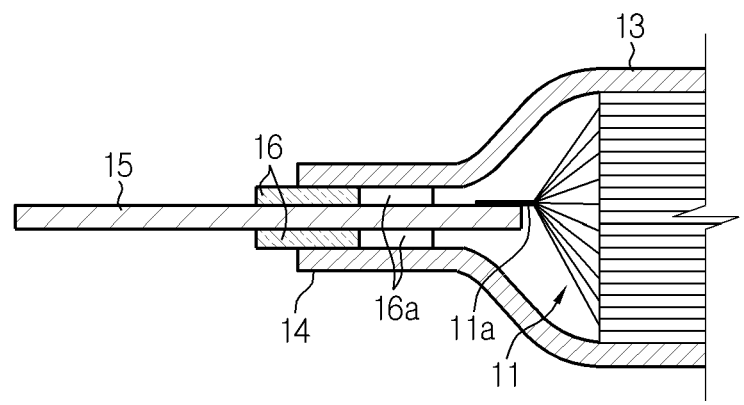
Figure 9:
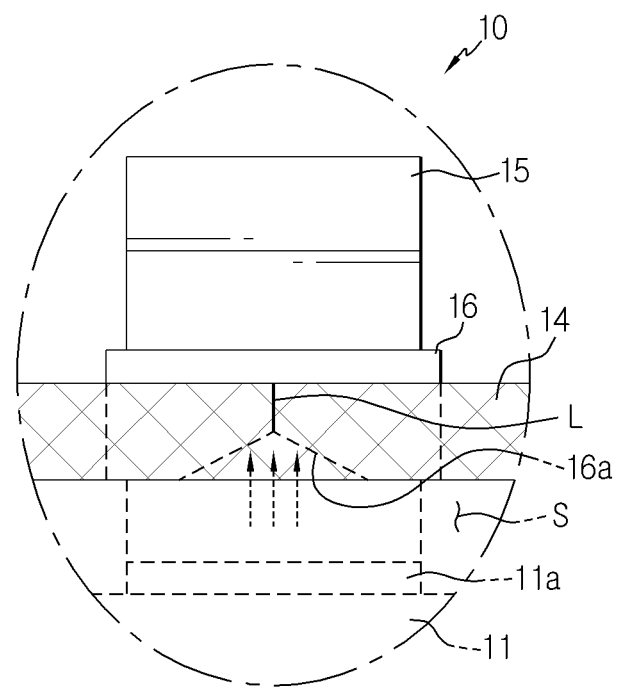
FIGS. 9 and 10 are diagrams showing a battery cell having venting patterns different from FIG. 7.
Figure 10:
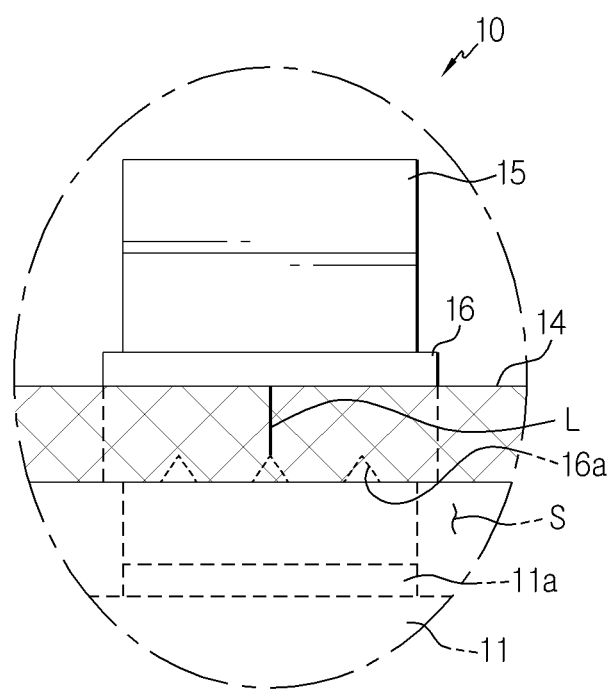

FIG. 6 is an enlarged view showing a portion M of FIG. 3, and FIGS. 7 and 8 are cross-sectioned views, taken along the line 7-7 of FIG. 6. Also, FIGS. 9 and 10 are diagrams showing a battery cell having venting patterns different from FIG. 7.

The battery module according to another embodiment of the present disclosure is different from the battery module according to the former embodiment just in the structure of the sealant 16 provided at the battery cell 10, and other components are substantially the same.

Thus, in describing the battery module according to another embodiment of the present disclosure, the structure of the sealant 16 of the battery cell 10 will be described in detail, and other features identical or similar to those of the former embodiment will not be described in detail.

In the battery cell 10 applied to the present disclosure, the sealing portion 14 is formed not only in the direction in which the electrode lead 15 is drawn out but is formed around the accommodation portion 13 on the whole, and thus there is a possibility that venting occurs at the outside of the frame 30 as well when the inner pressure increases.

Referring to FIGS. 6 and 7, the battery module according to an embodiment of the present disclosure has a venting pattern 16a formed at the sealant 16 in order to prevent the venting from occurring outside the support frame 30 as described above.

The venting pattern 16a corresponds to a notch formed with a predetermined depth at the surface of the sealant 16, which forms the thickness thereof and faces the electrode assembly 11. That is, the venting pattern 16a is formed along the extension direction of the electrode lead 15, namely the longitudinal direction.

At least a portion of the venting pattern 16a is located in a region overlapping the sealing portion 14 of the pouch case 12. Thus, when gas is generated inside the pouch case 12, the pressure may be concentrated in the region where the venting pattern 16a is formed (see the arrows in FIG. 6), so that the sealing of the pouch case 12 may be quickly released.

By forming the venting pattern 16a in the sealant 16 to partially reduce the adhesive force between the sealant 16 and the pouch case 12, it is possible to control that the venting occurs in a desired region. In the battery module according to another embodiment of the present disclosure, the region where the venting pattern 16a is formed corresponds to the inner space of the support frame 30, and thus it is possible to inject the gas intensively through the injection slit 32 when the venting occurs.

The venting pattern 16a may be formed on any one of both surfaces of the electrode lead 15 (see FIG. 7), but may also be formed on both surfaces of the electrode lead 15 (see FIG. 8) so that venting may occur more easily.

Meanwhile, referring to FIGS. 9 and 10, the venting pattern 16a may be shaped to have a gradually decreasing width in the direction in which the electrode lead 15 is drawn. If the venting pattern 16a has a gradually decreasing width in the direction in which the electrode lead 15 is drawn, the effect of pressure concentration may be maximized, enabling faster venting. In particular, it is possible to more reliably prevent the venting from occurring in regions other than the region where the venting pattern 16a is formed.

In particular, the venting pattern 16a may have a wedge shape with a sharp tip as shown in FIG. 9. In this case, the effect of pressure concentration is maximized so that the adhesion between the sealing tape 16 and the inner surface of the pouch case 12 may be easily released along a line L extending from an end edge of the venting pattern 16a.

In addition, as shown in FIG. 10, the venting pattern 16a of the wedge shape may be provided in plural, and the plurality of venting patterns 16a may be spaced apart from each other along the longitudinal direction of sealant 16, namely in a direction perpendicular to the extension direction of the electrode lead 15.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A battery module, comprising:
    a cell stack having a first battery cell and a second battery cell, which are stacked to face each other, each battery cell having an electrode lead;
    a connector configured to connect the electrode leads of the pair of battery cells, the connector having a first end connected to the electrode lead of the first battery cell and a second end connected to the electrode lead of the second battery cell; and
    a support frame provided to at least one side of the cell stack, the support frame comprising:
        a pair of lead slits at which the electrode leads are drawn; and
        an injection slit formed between the pair of lead slits to function as a passage through which a venting gas discharged at venting of the battery cell is injected,
    wherein the connector extends over the injection slit.

2. The battery module according to claim 1, wherein an end of each electrode lead exposed out of the lead slit is bent and supported by the support frame.

3. The battery module according to claim 1, wherein each battery cell further comprises a terrace portion, and
    wherein the injection slit is formed at a location corresponding to a space formed between the terrace portions of the first battery cell and the second battery cell.

4. The battery module according to claim 1, wherein a bonding portion between the support frame and the cell stack is sealed so that the venting gas is discharged out only through the injection slit.

5. The battery module according to claim 1, wherein a sealing member is interposed in an empty space formed between an inner surface of the lead slit and the electrode lead.

6. The battery module according to claim 1, wherein the battery cell includes:
    an electrode assembly having an electrode tab;
    an electrode lead attached to the electrode tab;
    a pouch case configured to accommodate the electrode assembly so that the electrode lead is drawn out; and
    a sealing tape having a venting pattern and interposed between the electrode lead and an inner surface of the pouch case.

7. The battery module according to claim 6, wherein the venting pattern is a notch formed with a predetermined depth along an extension direction of the electrode lead.

8. The battery module according to claim 7, wherein the venting pattern is shaped to have a gradually decreasing width along an extension direction of the electrode lead.

9. The battery module according to claim 8, wherein the venting pattern has a wedge shape.

10. The battery module according to claim 7, wherein the venting pattern is provided in plural, and the plurality of venting patterns are spaced apart from each other along a longitudinal direction of the sealing tape.

11. The battery module according to claim 7, wherein the pouch case has a sealing region formed at a rim thereof, and
    wherein at least a portion of the venting pattern is located within the sealing region.

12. The battery module according to claim 7, wherein the venting pattern is formed at opposite surfaces of the electrode lead.

13. The battery module according to claim 1, wherein the connector is arcuate.

* * * * *